(12) United States Patent
Tetsuka et al.

(10) Patent No.: US 10,458,868 B2
(45) Date of Patent: Oct. 29, 2019

(54) BICYCLE CRANK ARM ASSEMBLY

(71) Applicants: Shimano Inc., Sakai, Osaka (JP); Minebea Co., Ltd., Kitasaku-gun, Nagano (JP)

(72) Inventors: Toshio Tetsuka, Osaka (JP); Fumiaki Yoshida, Osaka (JP); Shintaro Mori, Osaka (JP); Toru Arai, Nagano (JP); Kui Li, Nagano (JP); Tomoaki Watanuki, Nagano (JP)

(73) Assignees: Shimano Inc., Osaka (JP); MinebeaMitsumi Inc., Nagano (JP)

( * ) Notice: Subject to any disclaimer, the term of this patent is extended or adjusted under 35 U.S.C. 154(b) by 53 days.

(21) Appl. No.: 15/379,463

(22) Filed: Dec. 14, 2016

(65) Prior Publication Data

US 2017/0176275 A1    Jun. 22, 2017

(30) Foreign Application Priority Data

Dec. 21, 2015 (JP) .................................. 2015-248639

(51) Int. Cl.

| | | |
|---|---|---|
| *G01L 5/22* | (2006.01) | |
| *B62M 1/36* | (2013.01) | |
| *B62M 3/16* | (2006.01) | |
| *G01L 5/16* | (2006.01) | |
| *G01L 1/22* | (2006.01) | |
| *G01L 5/13* | (2006.01) | |
| *B62J 99/00* | (2009.01) | |

(52) U.S. Cl.
CPC .............. *G01L 5/225* (2013.01); *B62M 1/36* (2013.01); *B62M 3/16* (2013.01); *G01L 1/2206* (2013.01); *G01L 5/13* (2013.01); *G01L 5/161* (2013.01); *B62J 2099/002* (2013.01)

(58) Field of Classification Search
CPC .......... G01L 5/225; G01L 5/161; B62M 1/36; B62M 3/00; B62M 3/16
See application file for complete search history.

(56) References Cited

U.S. PATENT DOCUMENTS

| | | |
|---|---|---|
| 4,141,248 A | 2/1979 | Bargenda |
| 4,463,433 A | 7/1984 | Hull et al. |
| 8,006,574 B2 | 8/2011 | Meyer |
| 8,065,926 B2 | 11/2011 | Meyer |

(Continued)

FOREIGN PATENT DOCUMENTS

| | | |
|---|---|---|
| DE | 4227586 A1 | 2/1994 |
| DE | 10 2013 101 952 A1 | 9/2013 |

(Continued)

*Primary Examiner* — Thomas C Diaz
(74) *Attorney, Agent, or Firm* — Global IP Counselors, LLP

(57) ABSTRACT

A bicycle crank arm assembly basically includes a bicycle crank arm and first to third detecting circuits. The first detecting circuit is configured to detect a force acting in a first direction. The second detecting circuit is configured to detect a force acting in a second direction. The third detecting circuit is configured to detect a moment. The first detecting circuit includes a first strain sensor that is mounted to an attachment surface. The second detecting circuit includes a second strain sensor that is mounted to the attachment surface. The third detecting circuit includes a third strain sensor that is mounted to the attachment surface.

35 Claims, 4 Drawing Sheets

(56) References Cited

U.S. PATENT DOCUMENTS

| | | |
|---|---|---|
| 8,505,393 B2 | 8/2013 | Meyer |
| 9,010,201 B2 | 4/2015 | Kodama et al. |
| 2003/0163287 A1 | 8/2003 | Vock et al. |
| 2006/0143645 A1 | 6/2006 | Vock et al. |
| 2008/0236293 A1 | 10/2008 | Meggiolan |
| 2009/0120210 A1 | 5/2009 | Phillips et al. |
| 2010/0263468 A1 | 10/2010 | Fisher et al. |
| 2012/0214646 A1 | 8/2012 | Lull et al. |
| 2012/0330572 A1* | 12/2012 | Longman .................. B62M 3/00 702/44 |
| 2013/0019700 A1 | 1/2013 | Matsumoto |
| 2013/0104650 A1 | 5/2013 | Bailey et al. |
| 2013/0205916 A1 | 8/2013 | Kodama et al. |
| 2013/0210583 A1 | 8/2013 | Kametani et al. |
| 2013/0233126 A1* | 9/2013 | Tetsuka ................... B62M 3/00 74/594.1 |
| 2014/0165744 A1 | 6/2014 | Lull et al. |
| 2015/0046100 A1 | 2/2015 | Matsumoto |

FOREIGN PATENT DOCUMENTS

| | | |
|---|---|---|
| EP | 2477881 A1 | 7/2012 |
| EP | 2631621 A2 | 8/2013 |
| JP | 2005-315819 A | 11/2005 |
| JP | 2014-044176 A | 3/2014 |
| JP | 5483299 B2 | 5/2014 |
| JP | 5483300 B | 5/2014 |
| JP | 5490914 B | 5/2014 |
| JP | 5490915 B | 5/2014 |
| JP | 5490916 B | 5/2014 |
| JP | 5490917 B | 5/2014 |
| JP | 2014-134505 A | 7/2014 |
| JP | 2014-134506 A | 7/2014 |
| JP | 2014-134507 A | 7/2014 |
| JP | 2014-134508 A | 7/2014 |
| JP | 2014-134509 A | 7/2014 |
| JP | 2014-134510 A | 7/2014 |
| JP | 5719936 B | 5/2015 |
| WO | 2008/110836 A1 | 9/2008 |
| WO | 2009/006673 A1 | 1/2009 |
| WO | 2011/030215 A1 | 3/2011 |
| WO | 2011/063468 A1 | 6/2011 |
| WO | 2012/053114 A1 | 4/2012 |
| WO | 2012/056510 A1 | 5/2012 |
| WO | 2012/056522 A1 | 5/2012 |
| WO | 2012/056558 A1 | 5/2012 |
| WO | 2013-017465 A2 | 2/2013 |
| WO | 2015/141008 A1 | 9/2015 |
| WO | 2016/009536 A1 | 1/2016 |
| WO | 2016/009537 A1 | 1/2016 |
| WO | 2016/009538 A1 | 1/2016 |
| WO | 2016/009539 A1 | 1/2016 |
| WO | 2016/009540 A1 | 1/2016 |

\* cited by examiner

BICYCLE CRANK ARM ASSEMBLY

CROSS-REFERENCE TO RELATED APPLICATIONS

This application claims priority to Japanese Patent Application No. 2015-248639, filed on Dec. 21, 2015. The entire disclosure of Japanese Patent Application No. 2015-248639 is hereby incorporated herein by reference.

BACKGROUND

Field of the Invention

The present invention relates to a bicycle crank arm assembly.

Background Information

Japan Laid-open Patent Application Publication No 2014-134507 discloses a measuring device for measuring a force acting on a bicycle crank.

SUMMARY

It has been demanded to produce a bicycle crank arm assembly capable of measuring a force acting on a bicycle crank as accurately as possible.

A bicycle crank arm assembly according to a first aspect of the present invention basically includes a bicycle crank arm and first to third detecting circuits. The bicycle crank arm includes a pedal shaft joint part configured to be joined to a pedal shaft. The bicycle crank arm is configured to be rotatable about an axis of a crank spindle. The first detecting circuit is configured to detect a force acting in a first direction when a load is applied to the bicycle crank arm through the pedal shaft. The first direction is a direction of a tangent at the pedal shaft to an imaginary circle about the axis of the crank spindle. The second detecting circuit is configured to detect a force acting in a second direction when the load is applied to the bicycle crank arm through the pedal shaft. The second direction is parallel to a radial direction of the imaginary circle about the axis of the crank spindle. The third detecting circuit is configured to detect a moment acting about an axis intersecting with the crank spindle and the pedal shaft of the bicycle crank arm when the load is applied to the bicycle crank arm through the pedal shaft. The bicycle crank arm includes an attachment surface intersecting with the axis of the crank spindle. The first detecting circuit includes at least one first strain sensor mounted to the attachment surface. The second detecting circuit includes at least one second strain sensor mounted to the attachment surface. The third detecting circuit includes at least one third strain sensor mounted to the attachment surface.

According to this construction, the force acting in the first direction can be detected by the first detecting circuit; the force acting in the second direction can be detected by the second detecting circuit; and the moment acting about the axis intersecting with the crank spindle and the pedal shaft of the bicycle crank arm can be detected by the third detecting circuit. As a result, the crank arm assembly according to the present invention can measure the force acting on a bicycle crank as accurately as possible. Additionally, the first to third detecting circuits are all attached to the attachment surface. In other words, the first to third detecting circuits are all attached to the same surface. In this regard, the crank arm assembly is simply constructed.

The at least one first strain sensor can have a detecting direction tilting at a first angle relatively to the second direction in a view seen from a direction parallel to an axial direction of the crank spindle. The first angle can be set in accordance with a shape of the bicycle crank arm. The first angle can be in a range of 25 degrees or less.

The at least one second strain sensor can have a detecting direction tilting at a second angle relatively to the second direction in the view seen from the direction parallel to the axial direction of the crank spindle. The second angle can be set in accordance with the shape of the bicycle crank arm. The second angle can be in a range of 25 degrees or less.

The at least one third strain sensor can be set to have a detecting direction intersecting with the first and second directions in the view seen from the direction parallel to the axial direction of the crank spindle.

The at least one first strain sensor of the first detecting circuit can include a plurality of first strain sensors. At least one of the plurality of first strain sensors can have a detecting direction tilting at a third angle relatively to the second direction in the view seen from the direction parallel to the axial direction of the crank spindle. The third angle can be set in accordance with the shape of the bicycle crank arm. The third angle can be in a range of 25 degrees or less.

The detecting direction of the at least one of the plurality of first strain sensors can be arranged along the second direction in the view seen from the direction parallel to the axial direction of the crank spindle.

The at least one first strain sensor of the first detecting circuit can include four of the first strain sensors. The attachment surface can be divided into a first region and a second region by a plane that includes the axis of the crank spindle, and is parallel to the second direction. Two of the four of the first strain sensors can be disposed in the first region. Remaining two of the four of the first strain sensors can be disposed in the second region.

The two of the first strain sensors disposed in the first region can be separated at an interval in the second direction. The remaining two of the first strain sensors disposed in the second region can be separated at an interval in the second direction.

The two of the first strain sensors disposed in the first region can have detecting directions parallel to the second direction in the view seen from the direction parallel to the axial direction of the crank spindle. The remaining two of the first strain sensors disposed in the second region can have detecting directions tilting at a fourth angle relatively to the second direction in the view seen from the direction parallel to the axial direction of the crank spindle. The fourth angle can be set in accordance with the shape of the bicycle crank arm. The fourth angle can be in a range of 25 degrees or less.

The second detecting circuit can include at least one fourth strain sensor mounted to the attachment surface. The at least one fourth strain sensor can have a detecting direction tilting at a fifth angle relatively to the first direction in the view seen from the direction parallel to the axial direction of the crank spindle. The fifth angle can be set in accordance with the shape of the bicycle crank arm. The fifth angle can be in a range of 25 degrees or less.

The at least one second strain sensor and the at least one fourth strain sensor of the second detecting circuit can include two of the second strain sensors and two of the fourth strain sensors. At least one of the two of the fourth strain sensors can have a detecting direction tilting at a sixth angle relatively to the first direction in the view seen from the direction parallel to the axial direction of the crank spindle. The sixth angle can be set in accordance with the shape of the bicycle crank arm. The sixth angle can be in a range of 25 degrees or less.

The attachment surface can be divided into the first region and the second region by the plane that includes the axis of the crank spindle and is parallel to the second direction. One of the two of the second strain sensors and one of the two of the fourth strain sensors can be disposed in the first region. The other of the two of the second strain sensors and the other of the two of the fourth strain sensors can be disposed in the second region.

The two of the second strain sensors can be disposed between the two of the fourth strain sensors in the first direction.

The two of the fourth strain sensors can have different detecting directions.

The at least one third strain sensor of the third detecting circuit can include at least two of the third strain sensors. The at least two of the third strain sensors can have different detecting directions.

The at least two of the third strain sensors of the third detecting circuit can include four of the third strain sensors. The attachment surface can be divided into the first region and the second region by the plane that includes the axis of the crank spindle, and is parallel to the second direction. Two of the four of the third strain sensors can be disposed in the first region. Remaining two of the four of the third strain sensors can be disposed in the second region.

The two of the third strain sensors disposed in the first region can be separated at an interval in the second direction. The remaining two of the third strain sensors disposed in the second region can be separated at an interval in the second direction.

At least one of the four of the third strain sensors can have a detecting direction tilting at a seventh angle relatively to a direction tilting at an angle of 45 degrees relatively to the first direction in the view seen from the direction parallel to the axial direction of the crank spindle. The seventh angle can be set in accordance with the shape of the bicycle crank arm. The seventh angle can be in a range of 25 degrees or less.

The bicycle crank arm assembly can further include a sheet member to which the first detecting circuit, the second detecting circuit and the third detecting circuit are mounted.

A bicycle crank arm assembly according to a second aspect of the present invention includes a bicycle crank arm and a first detecting circuit. The bicycle crank arm includes a pedal shaft joint part configured to be joined to a pedal shaft. The bicycle crank arm is configured to be rotatable about an axis of a crank spindle. The first detecting circuit is configured to detect a force acting in a first direction when a load is applied to the bicycle crank arm through the pedal shaft. The first direction is a direction of a tangent at the pedal shaft to an imaginary circle about the axis of the crank spindle. The bicycle crank arm includes an attachment surface intersecting with the axis of the crank spindle. The first detecting circuit includes a first strain sensor mounted to the attachment surface. The first strain sensor has a detecting direction tilting at an angle in a range of 25 degrees or less relatively to a second direction arranged orthogonally to the first direction in a view seen from a direction parallel to an axial direction of the crank spindle.

A bicycle crank arm assembly according to a third aspect of the present invention includes a bicycle crank arm and a second detecting circuit. The bicycle crank arm includes a pedal shaft joint part configured to be joined to a pedal shaft. The bicycle crank arm is configured to be rotatable about an axis of a crank spindle. The second detecting circuit is configured to detect a force acting in a second direction when a load is applied to the bicycle crank arm through the pedal shaft. The second direction is parallel to a radial direction of an imaginary circle about the axis of the crank spindle. The bicycle crank arm includes an attachment surface intersecting with the axis of the crank spindle. The second detecting circuit includes a second strain sensor and a fourth strain sensor, both of which are mounted to the attachment surface. The second strain sensor has a detecting direction forming an angle in a range of 25 degrees or less together with the second direction in a view seen from a direction parallel to an axial direction of the crank spindle. The fourth strain sensor has a detecting direction tilting at an angle in a range of 25 degrees or less relatively to a first direction arranged orthogonally to the second direction in the view seen from the direction parallel to the axial direction of the crank spindle.

A bicycle crank arm assembly according to a fourth aspect of the present invention includes a bicycle crank arm and a third detecting circuit. The bicycle crank arm includes a pedal shaft joint part configured to be joined to a pedal shaft. The bicycle crank arm is configured to be rotatable about an axis of a crank spindle. The third detecting circuit is configured to detect a moment acting about an axis intersecting with the crank spindle and the pedal shaft of the bicycle crank arm when a load is applied to the bicycle crank arm through the pedal shaft. The bicycle crank arm includes an attachment surface intersecting with the axis of the crank spindle. The third detecting circuit includes a third strain sensor mounted to the attachment surface. The third strain sensor has a detecting direction tilting at an angle in a range of 25 degrees or less relatively to a third direction in a view seen from a direction parallel to an axial direction of the crank spindle. The third direction herein tilts at an angle of 45 degrees relatively to a first direction, and the first direction is a direction of a tangent at the pedal shaft to an imaginary circle about the axis of the crank spindle.

The bicycle crank arm can have an asymmetric shape with reference to a plane including the axis of the crank spindle and an axis of the pedal shaft.

A bicycle crank arm assembly according to a fifth aspect of the present invention includes a bicycle crank arm and a first detecting circuit. The bicycle crank arm includes a pedal shaft joint part configured to be joined to a pedal shaft. The bicycle crank arm is configured to be rotatable about an axis of a crank spindle. The first detecting circuit is configured to detect a force acting in a first direction when a load is applied to the bicycle crank arm through the pedal shaft. The first direction is a direction of a tangent at the pedal shaft to an imaginary circle about the axis of the crank spindle. The bicycle crank arm includes an attachment surface on at least one of end surfaces thereof respectively located upstream and downstream in a rotational direction about the axis of the crank spindle. The first detecting circuit includes a first strain sensor mounted to the attachment surface. The first strain sensor has a detecting direction tilting at an angle in a range of 25 degrees or less relatively to a plane arranged perpendicular to the axis of the crank spindle and an axis of the pedal shaft in a view seen from a direction arranged perpendicular to a plane including the axis of the crank spindle and the axis of the pedal shaft.

Overall, the bicycle crank arm assembly according to the present invention is capable of measuring a force acting on the bicycle crank as accurately as possible.

BRIEF DESCRIPTION OF THE DRAWINGS

Referring now to the attached drawings which form a part of this original disclosure.

DETAILED DESCRIPTION OF EMBODIMENTS

Selected embodiments of a bicycle crank arm assembly will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

It should be noted that in the following explanation, the terms "right" and "left" refer to directions defined based on a bicycle moving direction, and a right-and-left direction is defined as a vehicle (bicycle) width direction.

Figure 1:
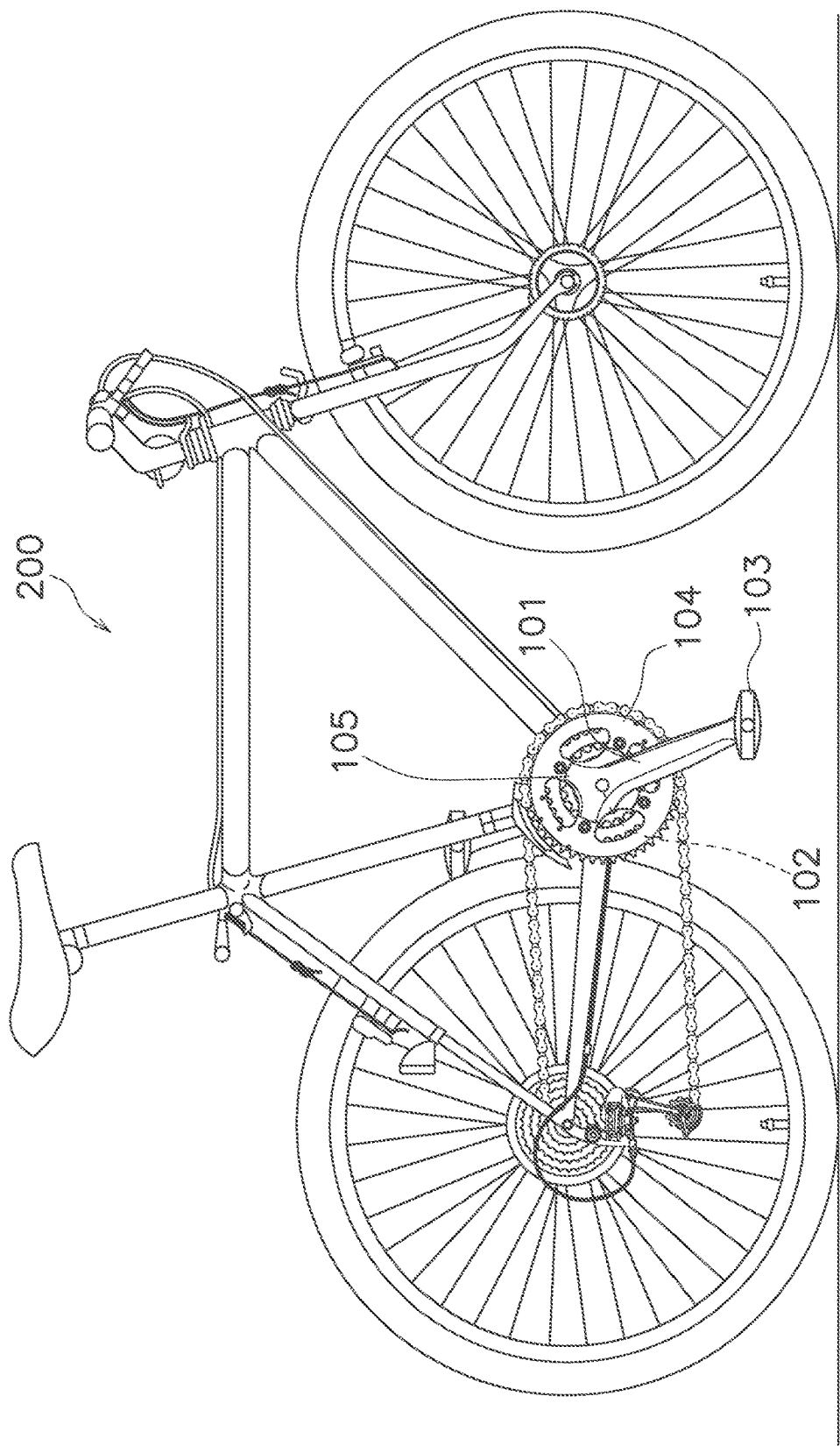
FIG. 1 is a side elevational view of a bicycle equipped with a bicycle crank arm assembly according to a first exemplary embodiment.

As shown in FIG. 1, a bicycle 200 includes a first crank arm 101, a second crank arm (not shown in the drawing), a crank spindle 102, a first pedal 103 and a second pedal (not shown in the drawing).

The crank spindle 102 extends in the vehicle (bicycle) width direction of the bicycle 200. The crank spindle 102 is supported by the bicycle 200 while being rotatable about an axis. The first crank arm 101 is mounted to a first end (right end) of the crank spindle 102 and radially extends therefrom. On the other hand, the second crank arm is mounted to a second end (left end) of the crank spindle 102 and radially extends therefrom. The first crank arm 101 and the second crank arm extend from the crank spindle 102 in different directions that shift at a phase of 180 degrees about the axis of the crank spindle 102. The first crank arm 101 and the second crank arm are rotatable about the axis of the crank spindle 102 as a rotational axis thereof. The first pedal 103 is attached to a free end of the first crank arm 101 through a pedal shaft 103a. On the other hand, the second pedal is attached to a free end of the second crank arm.

Figure 2:
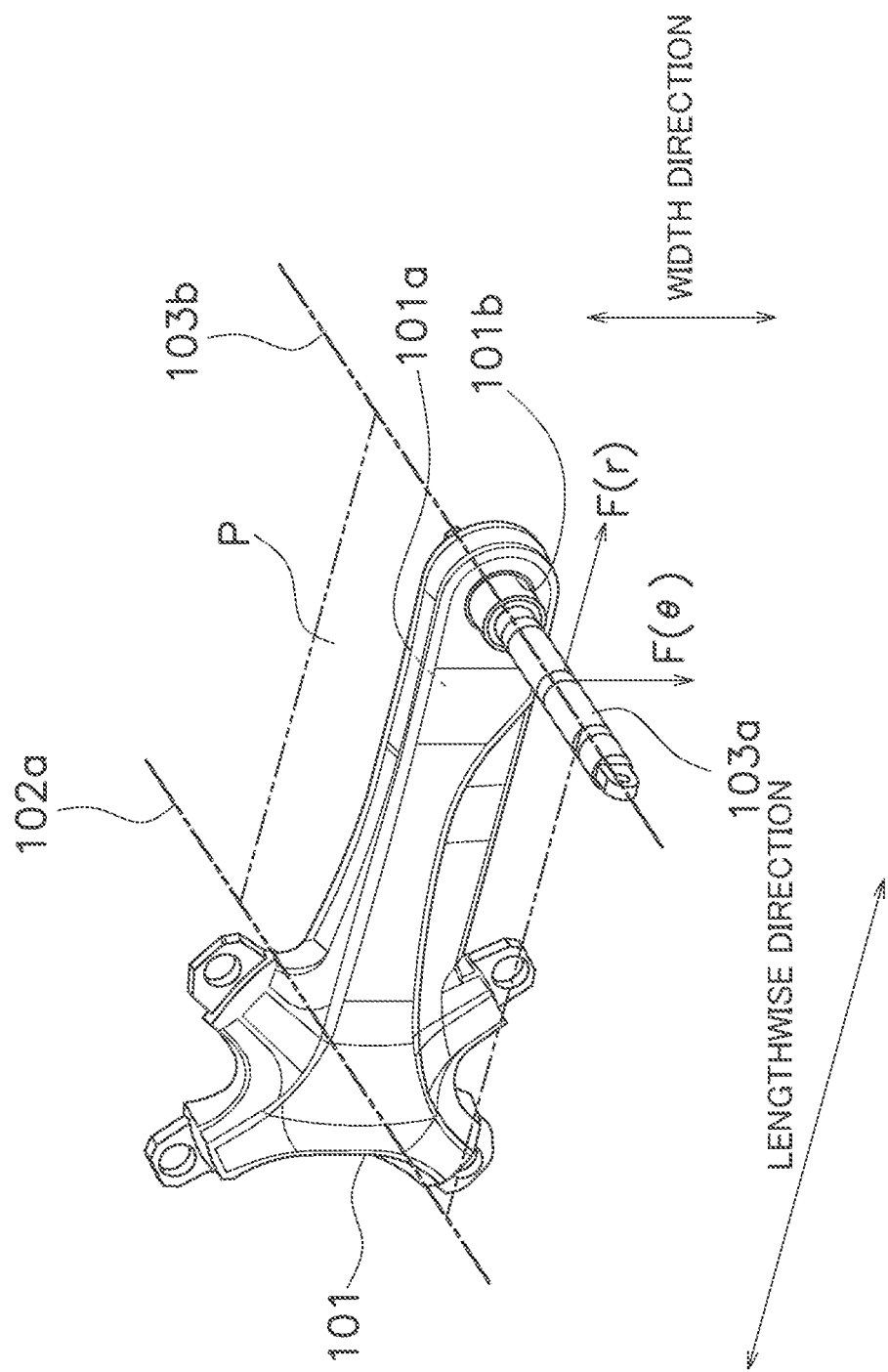
FIG. 2 is a perspective view of the bicycle crank arm assembly according to the first exemplary embodiment.

As shown in FIG. 2, the first crank arm 101 includes a pedal shaft joint part 101b The pedal shaft joint part 101b is configured to be joined to the pedal shaft 103a Specifically, the pedal shaft joint part 101b includes a screw hole. The pedal shaft 103a of the first pedal 103 is screwed into the pedal shaft joint part 101b of the first crank arm 101. Likewise, a pedal shaft of the second pedal is screwed into a pedal shaft joint part of the second crank arm. The first crank arm 101 further includes a sprocket joint part 105. The sprocket joint part 105 enables a front sprocket 104 to be joined to the first crank arm 101. The sprocket joint part 105 includes a plurality of arms extending in the radial direction of the crank spindle 102. Each of the arms is provided with a through hole in its free end. The through hole of each of the arms is bored in a direction parallel to the axial direction of the crank spindle 102. The first crank arm 101 is fixed to the crank spindle 102 by a fixation structure such as press-fitting or adhesion. Unlike the first crank arm 101, the second crank arm does not include any sprocket joint part. The second crank arm is detachably fixed to the crank spindle 102 by a fixation structure such as a bolt. The first crank arm 101 has a lengthwise direction and a width direction. The lengthwise direction and the width direction are orthogonal to each other.

The first crank arm 101 includes an attachment surface 101a. The attachment surface 101a can have only a flat surface, can have only a curved surface, or can have both of the flat surface and the curved surface. The attachment surface 101a is a surface intersecting with an axis 102a of the crank spindle 102. Specifically, the attachment surface 101a faces in the vehicle width direction. More specifically, the attachment surface 101a is a surface that faces to the left side in the vehicle width direction, and in other words, faces to a frame of the bicycle 200. The shape of the first crank arm 101 is asymmetric with reference to a plane P that includes the axis 102a of the crank spindle 102 and an axis 103b of the pedal shaft 103a.

Figure 3:
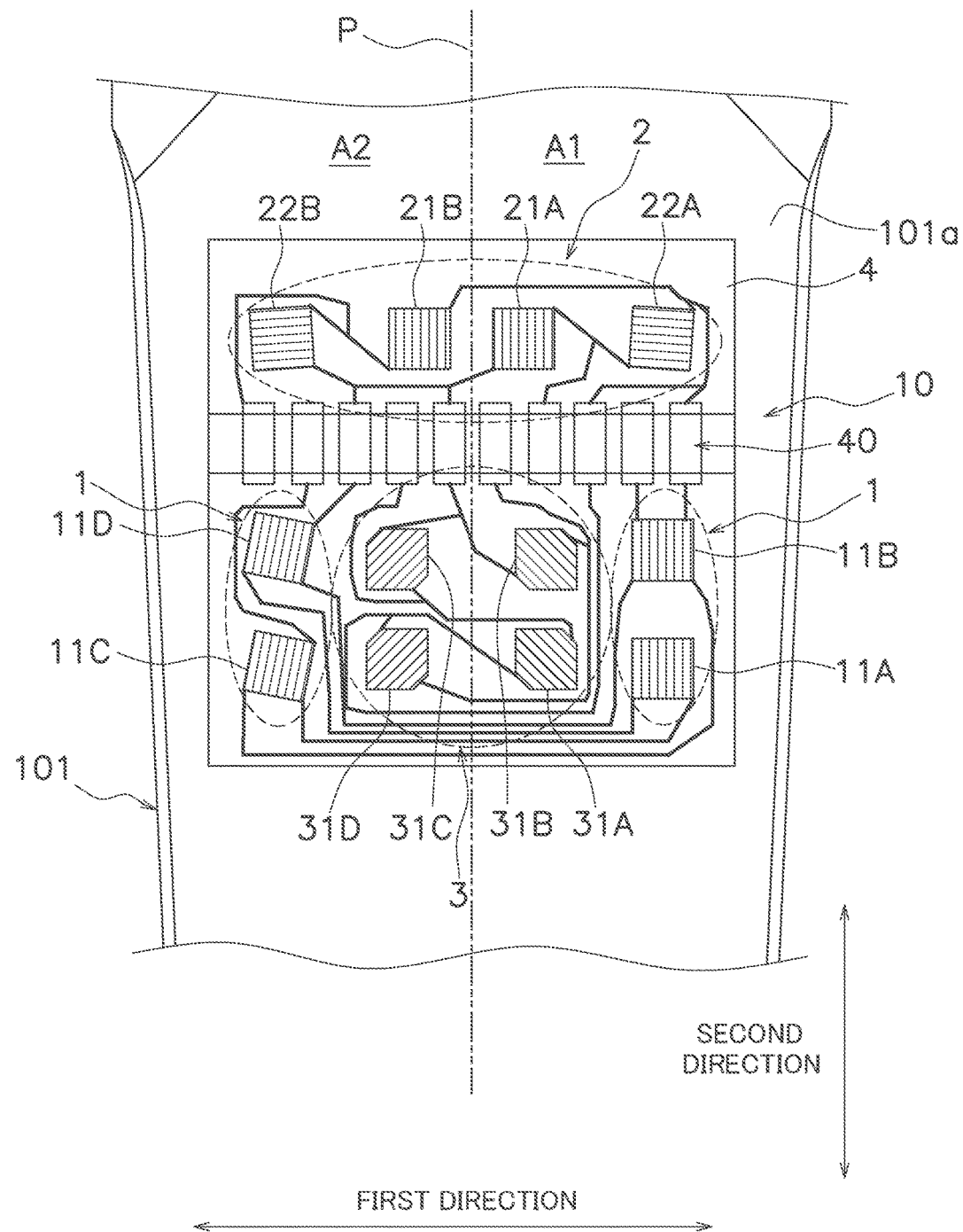
FIG. 3 is an enlarged portion of the bicycle crank arm assembly with diagram showing first to third detecting circuits on a bicycle crank arm of the bicycle crank arm assembly.

As shown in FIG. 3, a measuring device 10 is attached to the first crank arm 101, and is configured to measure a force acting on the first crank arm 101 when a rider treads the pedals. When described in detail, the measuring device 10 is capable of measuring the force acting on the first crank arm 101 by detecting a strain occurring in the first crank arm 101. It should be noted that another measuring device, constructed similarly to the measuring device 10, can be attached to the second crank arm in order to detect a strain occurring in the second crank arm. The measuring device 10 includes a first detecting circuit 1, a second detecting circuit 2 and a third detecting circuit 3. The first, second and third detecting circuits 1, 2 and 3 are mounted to a sheet member 4. The sheet member 4 has electrical insulating properties. The first, second and third detecting circuits 1, 2 and 3 are mounted to the surface or interior of the sheet member 4. The sheet member 4 is attached to the first crank arm 101. The sheet member 4 is fixed to the attachment surface 101a by, for instance, adhesion. It should be noted that the crank arm 101 to which the first, second and third detecting circuits 1, 2 and 3 have been attached corresponds to one example of a crank arm assembly of the present invention.

As described above, the measuring device 10 is integrally constructed. Hence, respective strain sensors can be easily attached to appropriate stress fields while their positions and angles are set with high precision. Additionally, productivity can be herein enhanced in comparison with a method of attaching strain sensors one by one. Moreover, the strain sensors are made up of the same type of resistive materials. Hence, enhancement in temperature properties can be expected.

The first detecting circuit 1 is configured to detect a force (Fθ) acting in a first direction when a load is applied to the first crank arm 101 through the pedal shaft 103a It should be noted that the term "first direction" refers to the direction of a tangent to an imaginary circle arranged about the axis 102a of the crank spindle 102 at the pedal shaft 103a. The term "first direction" can refer to the direction of a tangent to an imaginary circle arranged about the axis 102a of the crank spindle 102 at the axis 103b of the pedal shaft 103a. Specifically, the first direction is parallel to the width direction (see FIG. 2) of the first crank arm 101. On the other hand, the term "second direction" (to be described) refers to a direction parallel to the radial direction of the imaginary circle arranged about the axis 102a of the crank spindle 102. When described in detail, the term "second direction" refers to a direction extending from the pedal shaft 103 in perpendicular to the axis 102a of the crank spindle 102 and the axis 103b of the pedal shaft 103a. The second direction is parallel to the lengthwise direction (see FIG. 2) of the first crank arm 101.

The first detecting circuit 1 includes at least one first strain sensor 11 that is disposed on the attachment surface 101a Specifically, the first detecting circuit 1 includes four of the first strain sensors 11. The first detecting circuit 1 includes a Wheatstone bridge circuit using the four of the first strain sensors 11. The four of the first strain sensors 11 are herein respectively set as first strain sensors 11A, 11B, 11C and 11D. Each of the first strain sensors 11 is produced in the form of a strain gauge (or gauge) element. Each of the strain gauge elements can be, but is not limited to be, of a thin film type, an electrostatic capacity type, a semiconductor type, a thick film type and a piezoelectric type. Any suitable type of strain gauge element can be herein employed as long as it is capable of detecting a strain of the crank arm.

The attachment surface 101a is divided into a first region A1 and a second region A2. It should be noted that the attachment surface 101a is divided into the first region A1 and the second region A2 by the plane P that includes the axis 102a of the crank spindle 102, and is parallel to the second direction. Among the four of the first strain sensors 11, two of them (i.e., the first strain sensors 11A and 11B) are disposed in the first region A1, whereas the remaining two of them (i.e., the first strain sensors 11C and 11D) are disposed in the second region A2. The four of the first strain sensors 11 are connected such that the first strain sensors 11A and 11B compose one of two pairs of facing sides in the Wheatstone bridge circuit whereas the first strain sensors 11C and 11D compose the other of the two pairs of facing sides in the Wheatstone bridge circuit.

The two of the first strain sensors 11A and 11B, disposed in the first region A1, are disposed at an interval in the second direction. Additionally, the two of the first strain sensors 11C and 11D, disposed in the second region A2, are also disposed at an interval in the second direction.

In a view seen from a direction parallel to the axial direction of the crank spindle 102, each of the first strain sensors 11 has a detecting direction that forms an angle of less than or equal to 25 degrees together with the second direction. The term "detecting direction" of each of the first strain sensors 11 refers to an extending direction of the resistive element of which each of the first strain sensors 11 is made up.

When described in detail, in the view seen from the direction parallel to the axial direction of the crank spindle 102, each of the two of the first strain sensors 11A and 11B disposed in the first region A1 has a detecting direction that is arranged substantially parallel to the second direction. On the other hand, in the view seen from the direction parallel to the axial direction of the crank spindle 102, each of the two of the first strain sensors 11C and 11D disposed in the second region A2 has a detecting direction that forms an angle of less than or equal to 25 degrees together with the second direction. In the view seen from the direction parallel to the axial direction of the crank spindle 102, the angle formed between the detecting direction of each of the first strain sensor 11 and the second direction corresponds to a first angle, a third angle and a fourth angle in the present invention. In the view seen from the direction parallel to the axial direction of the crank spindle 102, each of the two of the first strain sensors 11C and 11D disposed in the second region A2 preferably has a detecting direction that tilts relatively to the second direction at an angle of less than or equal to 25 degrees. The tilt angle is determined in accordance with the shape of the first crank arm 101.

It was found that especially in an asymmetrically designed crank arm, errors frequently occur when each of the first strain sensors 11 has a detecting direction parallel to the second direction in the view seen from the direction parallel to the axial direction of the crank spindle 102. By contrast, errors can be reduced by, as described above, tilting the detecting directions of the first strain sensors 11C and 11D. The term "errors" herein refers to an interference output of the force Fθ where the force Fr is applied. Therefore, accuracy in detection can be herein enhanced. It should be noted that it is herein only required for at least one of the four of the first strain sensors 11A, 11B, 11C and 11D to have a detecting direction tilting relatively to the second direction in the view seen from the direction parallel to the axial direction of the crank spindle 102.

The second detecting circuit 2 is configured to detect a force (Fr) acting in a second direction when a load is applied to the first crank arm 101 through the pedal shaft 103a. It should be noted that the term "second direction" refers to a direction parallel to the radial direction of an imaginary circle arranged about the axis 102a of the crank spindle 102. When described in detail, the term "second direction" refers to a direction extending from the pedal shaft 103 in a direction perpendicular to the axis 102a of the crank spindle 102 and the axis 103b of the pedal shaft 103a. The second direction is parallel to the lengthwise direction (see FIG. 2) of the first crank arm 101.

The second detecting circuit 2 includes at least one second strain sensor 21 and at least one fourth strain sensor 22. Each of the second and fourth strain sensors 21 and 22 is produced in the form of a strain gauge element. Each of the strain gauge elements can be, but is not limited to be, of a thin film type, an electrostatic capacity type, a semiconductor type, a thick film type and a piezoelectric type. Any suitable type of strain gauge element can be herein employed as long as it is capable of detecting a strain of the crank arm. Specifically, the second detecting circuit 2 includes two of the second strain sensors 21A and 21B and two of the fourth strain sensors 22A and 22B. The second detecting circuit 2 composes a Wheatstone bridge circuit using the two of the second strain sensors 21A and 21B and the two of the fourth strain sensors 22A and 22B. When described in detail, the second strain sensors 21 and the fourth strain sensors 22 are connected such that the second strain sensor 21A and the fourth strain sensor 22A compose one of two pairs of facing sides in the Wheatstone bridge circuit whereas the second strain sensor 21B and the fourth strain sensor 22B compose the other of the two pairs of facing sides in the Wheatstone bridge circuit.

The second strain sensors 21 and the fourth strain sensors 22 are disposed on the attachment surface 101a. When described in detail, one of the second strain sensors 21 (i.e., the second strain sensor 21A) and one of the fourth strain sensors 22 (i.e., the fourth strain sensor 22A) are disposed in the first region A1, whereas the other of the second strain sensors 21 (i.e., the second strain sensor 21B) and the other of the fourth strain sensors 22 (i.e., the fourth strain sensor 22B) are disposed in the second region A2.

In the view seen from the direction parallel to the axial direction of the crank spindle 102, each of the second strain sensors 21 has a detecting direction that forms an angle of less than or equal to 25 degrees together with the second direction. In the view seen from the direction parallel to the axial direction of the crank spindle 102, the second strain sensors 21 preferably have detecting directions that are arranged substantially parallel to each other. It should be noted that the term "detecting direction" of each of the second strain sensors 21 refers to an extending direction of the resistive material of which each of the second strain sensors 21 is made up.

In the view seen from the direction parallel to the axial direction of the crank spindle 102, each of the fourth strain sensors 22 has a detecting direction that forms an angle of less than or equal to 25 degrees together with the first direction. In the view seen from the direction parallel to the axial direction of the crank spindle 102, the angle formed between the detecting direction of each of the fourth strain sensors 22 and the first direction corresponds to a fifth angle and a sixth angle in the present invention. In the view seen from the direction parallel to the axial direction of the crank spindle 102, each of the fourth strain sensors 22 preferably has a detecting direction that tilts relatively to the first direction at an angle of less than or equal to 25 degrees. The tilt angle is determined in accordance with the shape of the first crank arm 101.

It was found that especially in an asymmetrically designed crank arm, errors frequently occur when each of the fourth strain sensors 22 has a detecting direction parallel to the first direction in the view seen from the direction parallel to the axial direction of the crank spindle 102. By contrast, errors can be reduced by, as described above, tilting the detecting directions of the fourth strain sensors 22. The term "errors" herein refers to an interference output of the force Fr where the force Fθ is applied. Therefore, accuracy in detection can be enhanced. It should be noted that it is herein only required for at least one of the fourth strain sensors 22A and 22B to have a detecting direction tilting relatively to the first direction in the view seen from the direction parallel to the axial direction of the crank spindle 102.

The detecting directions of the two of the fourth strain sensors 22 are different from each other. In other words, the detecting directions of the two of the fourth strain sensors 22 tilt relatively to the first direction in opposite tilt orientations. When described in detail, the detecting directions of the two of the fourth strain sensors 22 are substantially arranged line-symmetrically with reference to the plane P. It should be noted that the term "detecting direction" of each of the fourth strain sensors 22 refers to an extending direction of the resistive material of which each of the fourth strain sensors 22 is made up.

The second strain sensors 21 are respectively disposed at an interval in the first direction. Additionally, these two of the second strain sensors 21 are disposed closer to the plane P than the two of the fourth strain sensors 22 in the first direction. These two of the second strain sensors 21 are preferably disposed between the two of the fourth strain sensors 22. The second strain sensors 21 and the fourth strain sensors 22 are respectively disposed closer to the crank spindle 102 than the first strain sensors 11.

The third detecting circuit 3 is configured to detect a moment (L) when a load is applied to the first crank arm 101 through the pedal shaft 103a. It should be noted that the moment (L), configured to be detected by the third detecting circuit 3, is a moment acting about an axis that intersects with the crank spindle 102 and the pedal shaft 103a in the first crank arm 101. For example, the moment (L) acts about an axis that intersects with the axis 102a of the crank spindle 102 and the axis 103b of the pedal shaft 103a in the first crank arm 101.

The third detecting circuit 3 includes at least one third strain sensor 31 attached to the attachment surface 101a. Specifically, the third detecting circuit 3 includes four of the third strain sensors 31A, 31B, 31C and 31D. The third detecting circuit 3 composes a Wheatstone bridge circuit using the four of the third strain sensors 31. Each of the third strain sensors 31 is produced in the form of a strain gauge element. Each of the strain gauge elements can be, but is not limited to be, of a thin film type, an electrostatic capacity type, a semiconductor type, a thick film type and a piezo-electric type. Any suitable type of strain gauge element can be herein employed as long as it is capable of detecting a strain of the crank arm.

Two of the third strain sensors 31 (i.e., the third strain sensors 31A and 31B) are disposed in the first region A1, whereas the remaining two of them (i.e., the third strain sensors 31C and 31D) are disposed in the second region A2. The two of the third strain sensors 31A and 31B, disposed in the first region A1, are disposed at an interval in the second direction. Additionally, the two of the third strain sensors 31C and 31D, disposed in the second region A2, are disposed at an interval in the second direction. The four of the third strain sensors 31 are connected such that the third strain sensors 31A and 31B compose one of two pairs of facing sides in the Wheatstone bridge circuit whereas the third strain sensors 31C and 31D compose the other of the two pairs of facing sides in the Wheatstone bridge circuit. Each of the third strain sensors 31 is preferably disposed between either pair of the first strain sensors 11 in the first direction.

In the view seen from the direction parallel to the axial direction of the crank spindle 102, each of the third strain sensors 31 has a detecting direction that intersects with the first direction and the second direction. In the view seen from the direction parallel to the axial direction of the crank spindle 102, each of the third strain sensors 31C and 31D has a detecting direction that forms an angle of less than or equal to 25 degrees together with a direction tilting at an angle of 45 degrees relative to the first direction. Here, a seventh angle in the present invention corresponds to the aforementioned angle that is formed between the detecting direction of each of the third strain sensors 31C and 31D and the direction tilting at an angle of 45 degrees relative to the first direction in the view seen from the direction parallel to the axial direction of the crank spindle 102. Additionally, a third direction in the present invention corresponds to the aforementioned direction that tilts at an angle of 45 degrees relative to the first direction in the view seen from the direction parallel to the axial direction of the crank spindle 102. Each of the two of the third strain sensors 31C and 31D disposed in the second region A2 has a detecting direction that tilts relatively to the first direction, and specifically, tilts at an angle of less than or equal to 25 degrees relative to the direction tilting at an angle of 45 degrees relative to the first direction. The tilt angle is determined in accordance with the shape of the first crank arm 101.

It was found that especially in an asymmetrically designed crank arm, errors frequently occur when each of the third strain sensors 31C and 31D has a detecting direction tilting at an angle of 45 degrees relative to the first direction in the view seen from the direction parallel to the axial direction of the crank spindle 102. By contrast, errors can be reduced by, as described above, tilting the detecting directions of the third strain sensors 31. The term "errors" herein refers to an interference output of L where Fr is applied. Therefore, accuracy in detection can be enhanced. It should be noted that it is herein only required for at least one of the third strain sensors 31A, 31B, 31C and 31D to have a detecting direction tilting at an angle of 45 degrees relatively to the first direction.

The detecting directions of the third strain sensors 31A and 31B disposed in the first region A1 and those of the third strain sensors 31C and 31D disposed in the second region A2 are different from each other. In other words, the detecting directions of the third strain sensors 31A and 31B disposed in the first region A1 and those of the third strain sensors 31C and 31D disposed in the second region A2 tilt relatively to the first direction in opposite tilt orientations. When described in detail, the detecting directions of the third strain sensors 31A and 31B disposed in the first region A1 and those of the third strain sensors 31C and 31D disposed in the second region A2 are shifted by an angle in a range of 65 to 115 degrees. It should be noted that the term "detecting direction" of each of the third strain sensors 31 refers to an extending direction of the resistive material of which each of the third strain sensors 31 is made up.

A plurality of electrodes 40 are provided between the first and third strain sensors 11 and 31. The electrodes 40 are provided between the second and fourth strain sensors 21 and 22. The electrodes 40 are mounted to the sheet member 4 and are exposed on the surface of the sheet member 4. The electrodes 40 are mounted to the sheet member 4 while being aligned in line along the first direction. At least either of an electrode for applying a rated voltage and a ground electrode can be shared among the first detecting circuit 1, the second detecting circuit 2 and the third detecting circuit 3. In the example shown in FIG. 3, an electrode for applying a rated voltage and a ground electrode are shared between the first detecting circuit 1 and the second detecting circuit 2. Additionally, an electrode for applying a rated voltage and a ground electrode are shared between the second detecting circuit 2 and the third detecting circuit 3.

An external electric circuit is connected to the electrodes 40 through an electric line or a flexible printed circuit board. In the measuring device 10, the electrodes 40 are aligned in line, and hence, are easily connected to the external electric circuit. The external electric circuit includes a rated power supply, an AD converter, a microcomputer and so forth. The microcomputer is capable of enhancing measurement accuracy by measuring a force applied to the crank arm from a rider based on a predetermined computation formula using the force (Fθ) acting in the first direction, the force (Fr) acting in the second direction and the moment (L), which are indicated by signals outputted from the respective detecting circuits. The microcomputer is connected to a wireless communication device and is configured to transmit a measured result to an external device such as a computer, a cycle computer and so forth through the wireless communication device.

MODIFICATIONS

One embodiment of the present invention has been explained above. However, the present invention is not limited to the above, and a variety of changes can be made without departing from the scope of the present invention.

Modification 1

For example, in the aforementioned embodiment, each of the first to third detecting circuits 1 to 3 has a full bridge circuit configuration with four gauges. However, the bridge circuit configuration of each of the first to third detecting circuits 1 to 3 is not particularly limited to this. For example, each of the first to third detecting circuits 1 to 3 can have a quarter bridge circuit configuration with one gauge, or alternatively, can have a half bridge circuit configuration with two gauges. When each of the first to third detecting circuits 1 to 3 employs a quarter or half bridge circuit configuration, one or two strain sensors are mounted to the attachment surface 101a while a circuit board to be connected to the electrodes is provided with fixed resistors forming part of the bridge circuit. Specifically, when the first detecting circuit 1 employs a quarter bridge circuit configuration with one gauge, one first strain sensor 11 is disposed in, for instance, the first region A1. When the second detecting circuit 2 employs a quarter bridge circuit configuration with one gauge, one second strain sensor 21 is disposed in, for instance, a position overlapping with the plane P. When the third detecting circuit 3 employs a quarter bridge circuit configuration with one gauge, one fourth strain sensor 22 is disposed in, for instance, a position overlapping with the plane P. On the other hand, when the first detecting circuit 1 employs a half bridge circuit configuration with two gauges, one of two of the first strain sensors 11 is disposed in, for instance, the first region A1 whereas the other of the two of the first strain sensors 11 is disposed in, for instance, the second region A2 When the second detecting circuit 2 employs a half bridge circuit configuration with two gauges, one second strain sensor 21 and one fourth strain sensor 22 are disposed in, for instance, positions overlapping with the plane P. When the third detecting circuit 3 employs a half bridge circuit configuration with two gauges, two of the fourth strain sensors 22 having different detecting directions are disposed in, for instance, positions overlapping with the plane P.

Modification 2

In the aforementioned embodiment, the attachment surface 101a to which the first to third detecting circuits 1 to 3 are attached faces to the left in the vehicle width direction. However, the orientation of the attachment surface 101a is not limited to this. For example, the attachment surface 101a can face to the right in the vehicle width direction, i.e., face oppositely to the frame of the bicycle 200. Incidentally, when the first crank arm 101 has a hollow construction, the first to third detecting circuits 1 to 3 can be attached to either of the surfaces that face in the vehicle width direction and define the internal space of the first crank arm 101.

Modification 3

In the aforementioned embodiment, the first strain sensors 11 disposed in the second region A2 have detecting directions tilting relatively to the second direction. However, the detecting directions are not particularly limited to the above. For example, all the first strain sensors 11 can have detecting directions arranged substantially parallel to the second direction. For example, at least one of the first strain sensors 11 disposed in the second region A2 can have a detecting direction arranged substantially parallel to the second direction.

Modification 4

In the aforementioned embodiment, the fourth strain sensors 22 have detecting directions tilting relatively to the first direction. However, the detecting directions are not particularly limited to the above. For example, all the fourth strain sensors 22 can have detecting directions arranged substantially parallel to the first direction. For example, at least one of the two of the fourth strain sensors 22 can have a detecting direction arranged substantially parallel to the first direction.

Modification 5

In the aforementioned embodiment, the third strain sensors 31 disposed in the second region A2 have detecting directions tilting relatively to the direction tilting at an angle of 45 degrees relatively to the first direction. However, the detecting directions are not particularly limited to the above. For example, all of the third strain sensors 31 can have detecting directions arranged substantially parallel to the direction tilting at an angle of 45 degrees relatively to the first direction. For example, at least one of the third strain sensors 31 disposed in the second region A2 can have a detecting direction arranged substantially parallel to the direction tilting at an angle of 45 degrees relatively to the first direction.

Modification 6

In the aforementioned embodiment, the measuring device 10 can be provided with at least any one of the first, second and third detecting circuits 1, 2 and 3 without being provided with the rest of them.

Modification 7

In the aforementioned embodiment, at least one of each of the second strain sensors 21A and 21B and each of the fourth strain sensors 22A and 22B can have a detecting direction tilting relatively to a reference direction. For example, at least one of the second strain sensors 21A and 21B can have a detecting direction tilting relatively to a second direction as its reference direction in the view seen from the direction parallel to the axial direction of the crank spindle 102, whereas at least one of the fourth strain sensors 22A and 22B can have a detecting direction tilting relatively to the first direction as its reference direction in the view seen from the direction parallel to the axial direction of the crank spindle 102. In the view seen from the direction parallel to the axial direction of the crank spindle 102, an angle formed between the detecting direction of each of the second strain sensors 21A and 21B and the second direction corresponds to a second angle of the present invention.

Modification 8

Each of the first crank arm 101 and the second crank arm can be provided with the measuring device 10. Alternatively, only either of the first crank arm 101 and the second crank arm can be provided with the measuring device 10. When each of the first crank arm 101 and the second crank arm is provided with the measuring device 10, the measuring device 10 provided on the first crank arm 101 can be differently constructed from that provided on the second crank arm. For example, the strain sensors in the measuring device 10 provided on the first crank arm 101 can have different detecting directions from those in the measuring device 10 provided on the second crank arm. In this construction, optimal measurement is enabled in each of the crank arms.

Second Embodiment

A crank arm assembly of a second embodiment has basically the same construction as that of the first embodiment except for the configuration of the first detecting circuit and the position in which the first detecting circuit is disposed. Therefore, the second embodiment will be hereinafter explained only regarding its difference from that of the first preferred embodiment. In the second embodiment, the same constituent elements as those in the first embodiment will be denoted by the same reference sign and will not be explained.

Figure 4:
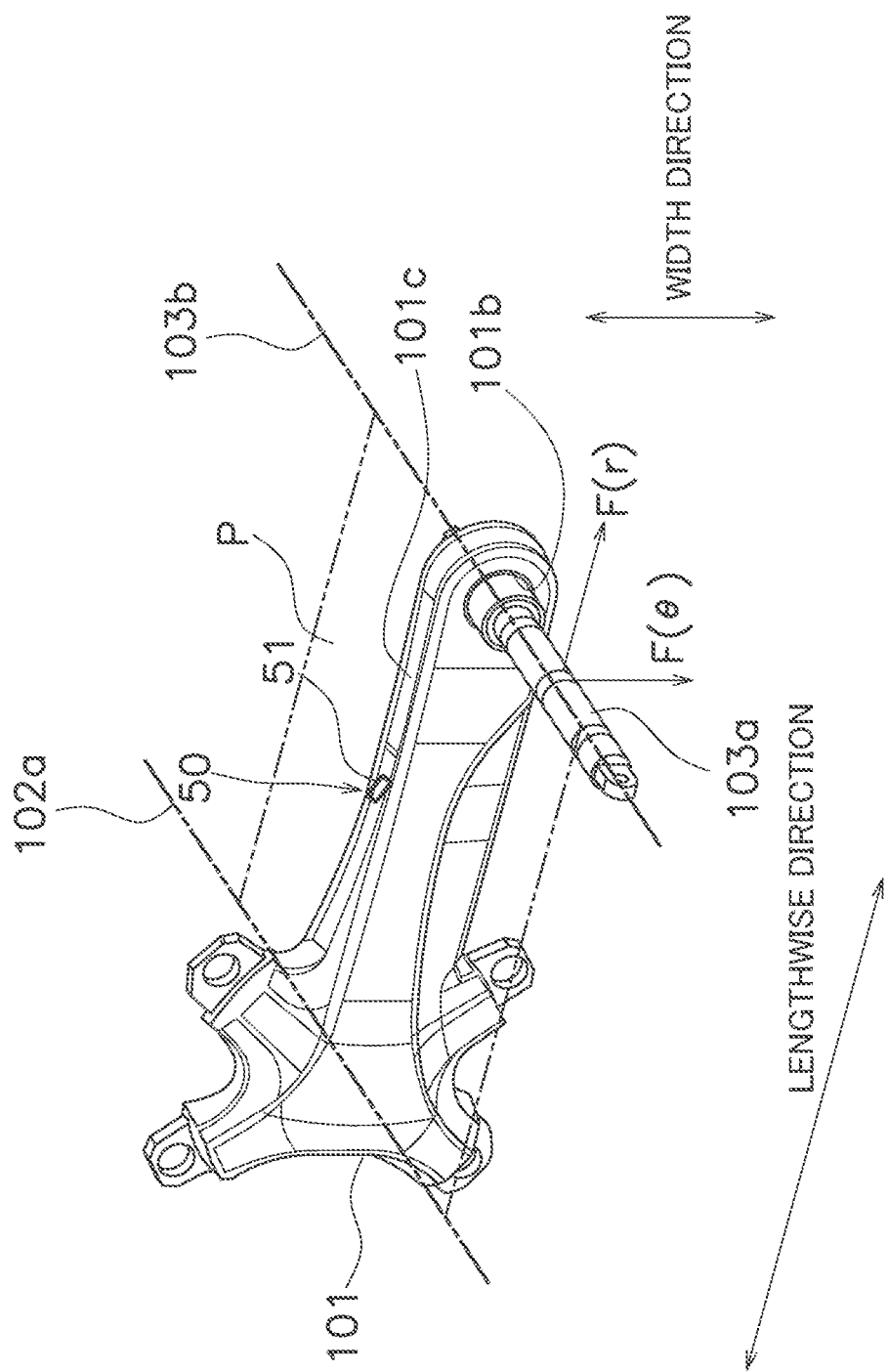
FIG. 4 is a perspective view of a bicycle crank arm assembly according to a second exemplary embodiment.

As shown in FIG. 4, the crank arm assembly of the second embodiment includes the first crank arm 101 and a first detecting circuit 50. Similarly, to the first detecting circuit 1, the first detecting circuit 50 is configured to detect a force (Fθ) acting in the first direction when a load is applied to the first crank arm 101 through the pedal shaft 103a. The first crank arm 101 includes an attachment surface 101c on at least one of its end surfaces respectively located upstream and downstream in the rotational direction about the axis 102a of the crank spindle 102. The upstream and downstream end surfaces of the first crank arm 101 are both end surfaces in the width direction of the first crank arm 101. The first detecting circuit 50 includes a first strain sensor 51 mounted to the attachment surface 101c. The first strain sensor 51 has a detecting direction tilting at an angle in a range of 25 degrees or less relatively to a perpendicular plane to the axis 102a of the crank spindle 102 and the axis 103b of the pedal shaft 103a in a view seen from a perpendicular direction to the plane P including the axis 102a of the crank spindle 102 and the axis 103b of the pedal shaft 103a. The tilt angle is determined in accordance with the shape of the first crank arm 101.

The crank spindle 102 can include the attachment surfaces 101c on both of its upstream and downstream end surfaces, and the first strain sensors 51 can be mounted to both of the attachment surfaces 101c. Additionally, a Wheatstone bridge circuit can be formed by connecting the first strain sensors 51 mounted to both of the attachment surfaces 101c In this case, the first strain sensors 51 are respectively connected such that those mounted to each of the attachment surfaces 101c compose a pair of facing sides in the Wheatstone bridge circuit. The first strain sensors 51 mounted to the attachment surfaces 101c on the upstream and downstream end surfaces can have different detecting directions or can have the same detecting direction in the view seen from the perpendicular direction to the plane P.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank arm assembly comprising:
   a bicycle crank arm including a pedal shaft joint part configured to be joined to a pedal shaft, the bicycle crank arm being configured to be rotatable about an axis of a crank spindle;
   a first detecting circuit configured to detect a force acting in a first direction when a load is applied to the bicycle crank arm through the pedal shaft, the first direction being a direction of a tangent at the pedal shaft to an imaginary circle about the axis of the crank spindle;
   a second detecting circuit configured to detect a force acting in a second direction when the load is applied to the bicycle crank arm through the pedal shaft, the second direction being a direction parallel to a radial direction of the imaginary circle about the axis of the crank spindle; and
   a third detecting circuit configured to detect a moment acting about an axis intersecting with the crank spindle and the pedal shaft of the bicycle crank arm when the load is applied to the bicycle crank arm through the pedal shaft,
   the bicycle crank arm including an attachment surface intersecting with the axis of the crank spindle, the attachment surface facing a vehicle width direction,
   the first detecting circuit including at least one first strain sensor mounted to the attachment surface,
   the second detecting circuit including at least one second strain sensor mounted to the attachment surface, and
   the third detecting circuit including at least one third strain sensor mounted to the attachment surface.

2. The bicycle crank arm assembly according to claim 1, wherein
   the at least one first strain sensor has a detecting direction tilting at a first angle relatively to the second direction in a view seen from a direction parallel to an axial direction of the crank spindle.

3. The bicycle crank arm assembly according to claim 2, wherein the first angle is set in accordance with a shape of the bicycle crank arm.

4. The bicycle crank arm assembly according to claim 2, wherein the first angle is in a range of 25 degrees or less.

5. The bicycle crank arm assembly according to claim 1, wherein
   the at least one second strain sensor has a detecting direction tilting at a second angle relatively to the second direction in a view seen from a direction parallel to an axial direction of the crank spindle.

6. The bicycle crank arm assembly according to claim 5, wherein the second angle is set in accordance with a shape of the bicycle crank arm.

7. The bicycle crank arm assembly according to claim 5, wherein the second angle is in a range of 25 degrees or less.

8. The bicycle crank arm assembly according to claim 1, wherein
   the at least one third strain sensor is set to have a detecting direction intersecting with the first and second directions in a view seen from a direction parallel to an axial direction of the crank spindle.

9. The bicycle crank arm assembly according to claim 1, wherein
   the at least one first strain sensor of the first detecting circuit includes a plurality of first strain sensors, and
   at least one of the plurality of first strain sensors has a detecting direction tilting at a third angle relatively to the second direction in a view seen from a direction parallel to an axial direction of the crank spindle.

10. The bicycle crank arm assembly according to claim 9, wherein the third angle is set in accordance with a shape of the bicycle crank arm.

11. The bicycle crank arm assembly according to claim 9, wherein the third angle is in a range of 25 degrees or less.

12. The bicycle crank arm assembly according to claim 9, wherein
   the detecting direction of the at least one of the plurality of first strain sensors is arranged along the second direction in the view seen from the direction parallel to the axial direction of the crank spindle.

13. The bicycle crank arm assembly according to claim 1, wherein
   the at least one first strain sensor of the first detecting circuit includes four of the first strain sensors,
   the attachment surface is divided into a first region and a second region by a plane, the plane including the axis of the crank spindle, the plane being parallel to the second direction,
   two of the four of the first strain sensors are disposed in the first region, and
   remaining two of the four of the first strain sensors are disposed in the second region.

14. The bicycle crank arm assembly according to claim 13, wherein
   the two of the first strain sensors disposed in the first region are separated at an interval in the second direction, and
   the remaining two of the first strain sensors disposed in the second region are separated at an interval in the second direction.

15. The bicycle crank arm assembly according to claim 13, wherein
the two of the first strain sensors disposed in the first region have detecting directions parallel to the second direction in a view seen from a direction parallel to an axial direction of the crank spindle, and
the remaining two of the first strain sensors disposed in the second region have detecting directions tilting at a fourth angle relatively to the second direction in the view seen from the direction parallel to the axial direction of the crank spindle.

16. The bicycle crank arm assembly according to claim 15, wherein the fourth angle is set in accordance with a shape of the bicycle crank arm.

17. The bicycle crank arm assembly according to claim 15, wherein the fourth angle is in a range of 25 degrees or less.

18. The bicycle crank arm assembly according to claim 1, wherein the second detecting circuit includes at least one fourth strain sensor mounted to the attachment surface, and
the at least one fourth strain sensor has a detecting direction tilting at a fifth angle relatively to the first direction in a view seen from a direction parallel to an axial direction of the crank spindle.

19. The bicycle crank arm assembly according to claim 18, wherein the fifth angle is set in accordance with a shape of the bicycle crank arm.

20. The bicycle crank arm assembly according to claim 18, wherein the fifth angle is in a range of 25 degrees or less.

21. The bicycle crank arm assembly according to claim 18, wherein
the at least one second strain sensor of the second detecting circuit includes two of the second strain sensors,
the at least one fourth strain sensor of the second detecting circuit includes two of the fourth strain sensors, and
at least one of the two of the fourth strain sensors has a detecting direction tilting at a sixth angle relatively to the first direction in the view seen from the direction parallel to the axial direction of the crank spindle.

22. The bicycle crank arm assembly according to claim 21, wherein the sixth angle is set in accordance with a shape of the bicycle crank arm.

23. The bicycle crank arm assembly according to claim 21, wherein the sixth angle is in a range of 25 degrees or less.

24. The bicycle crank arm assembly according to claim 21, wherein
the attachment surface is divided into a first region and a second region by a plane, the plane including the axis of the crank spindle, the plane being parallel to the second direction,
one of the two of the second strain sensors and one of the two of the fourth strain sensors are disposed in the first region, and
the other of the two of the second strain sensors and the other of the two of the fourth strain sensors are disposed in the second region.

25. The bicycle crank arm assembly according to claim 21, wherein
the two of the second strain sensors are disposed between the two of the fourth strain sensors in the first direction.

26. The bicycle crank arm assembly according to claim 24, wherein the two of the fourth strain sensors have different detecting directions.

27. The crank arm assembly according to claim 1, wherein the at least one third strain sensor of the third detecting circuit includes at least two of the third strain sensors, and
the at least two of the third strain sensors have different detecting directions.

28. The bicycle crank arm assembly according to claim 27, wherein
the at least two of the third strain sensors of the third detecting circuit include four of the third strain sensors,
the attachment surface is divided into a first region and a second region by a plane, the plane including the axis of the crank spindle, the plane being parallel to the second direction,
two of the four of the third strain sensors are disposed in the first region, and
remaining two of the four of the third strain sensors are disposed in the second region.

29. The bicycle crank arm assembly according to claim 28, wherein
the two of the third strain sensors disposed in the first region are separated at an interval in the second direction, and
the remaining two of the third strain sensors disposed in the second region are separated at an interval in the second direction.

30. The bicycle crank arm assembly according to claim 28, wherein
at least one of the four of the third strain sensors has a detecting direction tilting at a seventh angle relatively to a direction tilting at an angle of 45 degrees relatively to the first direction in a view seen from a direction parallel to an axial direction of the crank spindle.

31. The bicycle crank arm assembly according to claim 30, wherein the seventh angle is set in accordance with a shape of the bicycle crank arm.

32. The bicycle crank arm assembly according to claim 30, wherein the seventh angle is in a range of 25 degrees or less.

33. The crank arm assembly according to claim 1, further comprising:
a sheet member on which the first detecting circuit, the second detecting circuit and the third detecting circuit are mounted.

34. A bicycle crank arm assembly comprising:
a bicycle crank arm including a pedal shaft joint part configured to be joined to a pedal shaft, the bicycle crank arm being configured to be rotatable about an axis of a crank spindle; and
a second detecting circuit configured to detect a force acting in a second direction when a load is applied to the bicycle crank arm through the pedal shaft, the second direction being parallel to a radial direction of an imaginary circle about the axis of the crank spindle,
the bicycle crank arm including an attachment surface intersecting with the axis of the crank spindle,
the second detecting circuit including a second strain sensor and a fourth strain sensor, both the second strain sensor and the fourth strain sensor being mounted to the attachment surface,
the second strain sensor having a detecting direction forming an angle within a range of 25 degrees or less together with the second direction in a view seen from a direction parallel to an axial direction of the crank spindle, and
the fourth strain sensor having a detecting direction tilting at an angle within a range of 25 degrees or less relatively to a first direction in the view seen from the direction parallel to the axial direction of the crank spindle, the first direction being arranged orthogonally to the second direction.

35. A bicycle crank arm assembly comprising:
a bicycle crank arm including a pedal shaft joint part configured to be joined to a pedal shaft, the bicycle crank arm being configured to be rotatable about an axis of a crank spindle; and
a third detecting circuit configured to detect a moment acting about an axis intersecting with the crank spindle and the pedal shaft of the bicycle crank arm when a load is applied to the bicycle crank arm through the pedal shaft,
the bicycle crank arm including an attachment surface intersecting with the axis of the crank spindle,
the third detecting circuit including a third strain sensor mounted to the attachment surface, and
the third strain sensor having a detecting direction tilting at an angle within a range of 25 degrees or less relatively to a third direction in a view seen from a direction parallel to an axial direction of the crank spindle, the third direction tilting at an angle of 45 degrees relatively to a first direction, the first direction being a direction of a tangent at the pedal shaft to an imaginary circle about the axis of the crank spindle.

* * * * *